(12) United States Patent
Oyzerskiy et al.

(10) Patent No.: US 6,347,770 B1
(45) Date of Patent: Feb. 19, 2002

(54) DUAL-CONTROL STICK FOR AIRCRAFT

(75) Inventors: Eduard A. Oyzerskiy, Sandy; McGregor L. Corliss, West Bountiful, both of UT (US)

(73) Assignee: Groen Brothers Aviation, Inc., Salt Lake City, UT (US)

( * ) Notice: Subject to any disclaimer, the term of this patent is extended or adjusted under 35 U.S.C. 154(b) by 0 days.

(21) Appl. No.: 09/625,759

(22) Filed: Jul. 26, 2000

Related U.S. Application Data
(60) Provisional application No. 60/145,689, filed on Jul. 26, 1999, and provisional application No. 60/149,558, filed on Aug. 18, 1999.

(51) Int. Cl.[7] .......................... B64C 13/04; B64C 13/12
(52) U.S. Cl. ...................... 244/234; 244/221; 244/237; 244/229
(58) Field of Search .................. 244/221, 224, 244/223, 234, 237, 229; 74/491, 523

(56) References Cited

U.S. PATENT DOCUMENTS

| | | | | |
|---|---|---|---|---|
| 4,473,203 A | * | 9/1984 | Barnoin et al. | 224/234 |
| 4,865,277 A | * | 9/1989 | Smith et al. | 224/234 |
| 5,527,004 A | * | 6/1996 | Haggerty et al. | 224/234 |
| 5,769,363 A | * | 6/1998 | Griswold et al. | 244/234 |
| 5,782,436 A | * | 7/1998 | Pohling | 244/224 |

\* cited by examiner

Primary Examiner—J. Woodrow Eldred
(74) Attorney, Agent, or Firm—Pate Pierce & Baird

(57) ABSTRACT

A dual-seat control system for an aircraft provides an upright mounted at one end to pivot by actuation of a user near the other end. Cross beams extend from the upper end of the upright to positions in front of each user. The cross beams each carry a handle at an outboard end by which an operator can move the upright as a control stick in either a pitch-control direction, or a roll-control direction. The cross beams are free to move in one degree of freedom with respect to the upright, and are fixed in the other degree of freedom. Typically, the handle is attached in a manner to move in rigid body motion with respect to the upright in a pitch-control direction, while being free to move in a plane defined by the cross beam and upright at will, according to the desires of an operator. In certain embodiments, the handle may be required to be parallel to the upright in all positions, from a lower stowed position to an upper deployed position. According to operator choice, a control system may be secured to the upright to allow substantial movement (pivoting) by the handle in the plane defined by the upright and the cross beam. In other embodiments, the handle and upright may form extensions of the opposite legs of a parallelogram, thus moving in exact, congruency, separated by a distance in space.

20 Claims, 16 Drawing Sheets

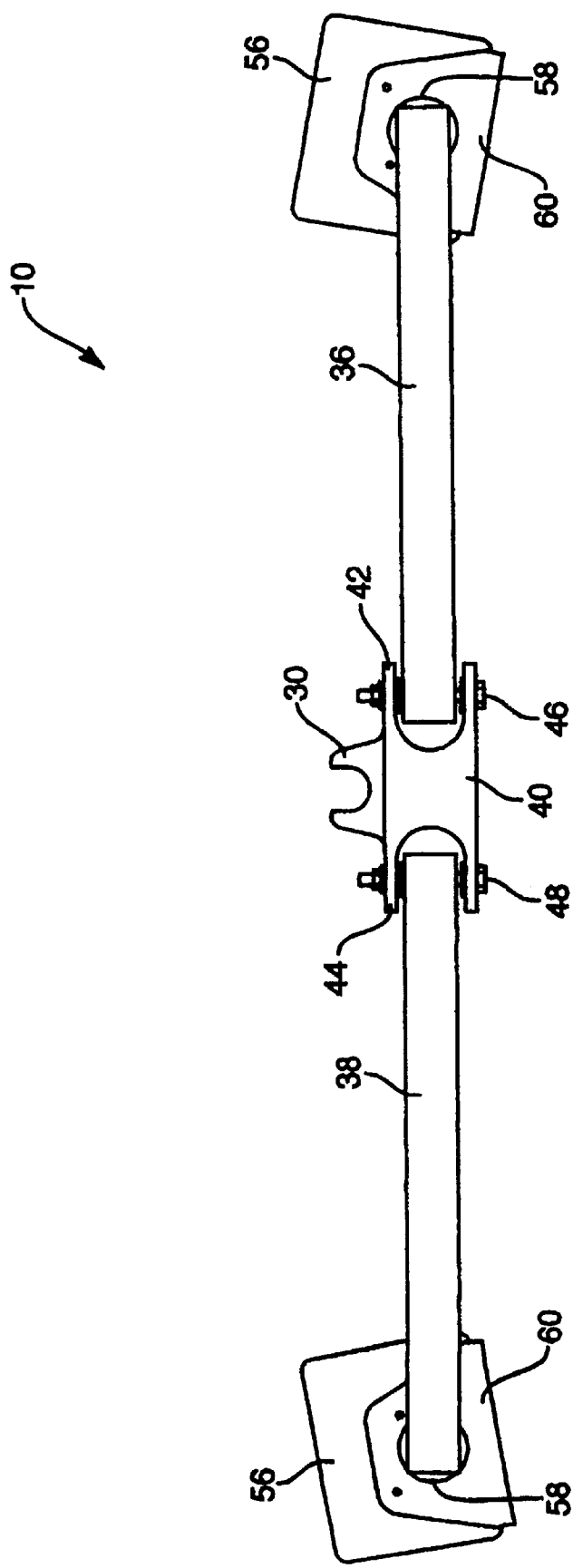
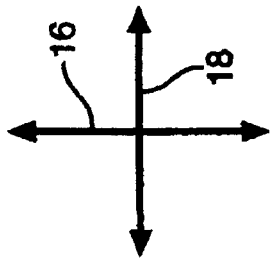
FIG. 5

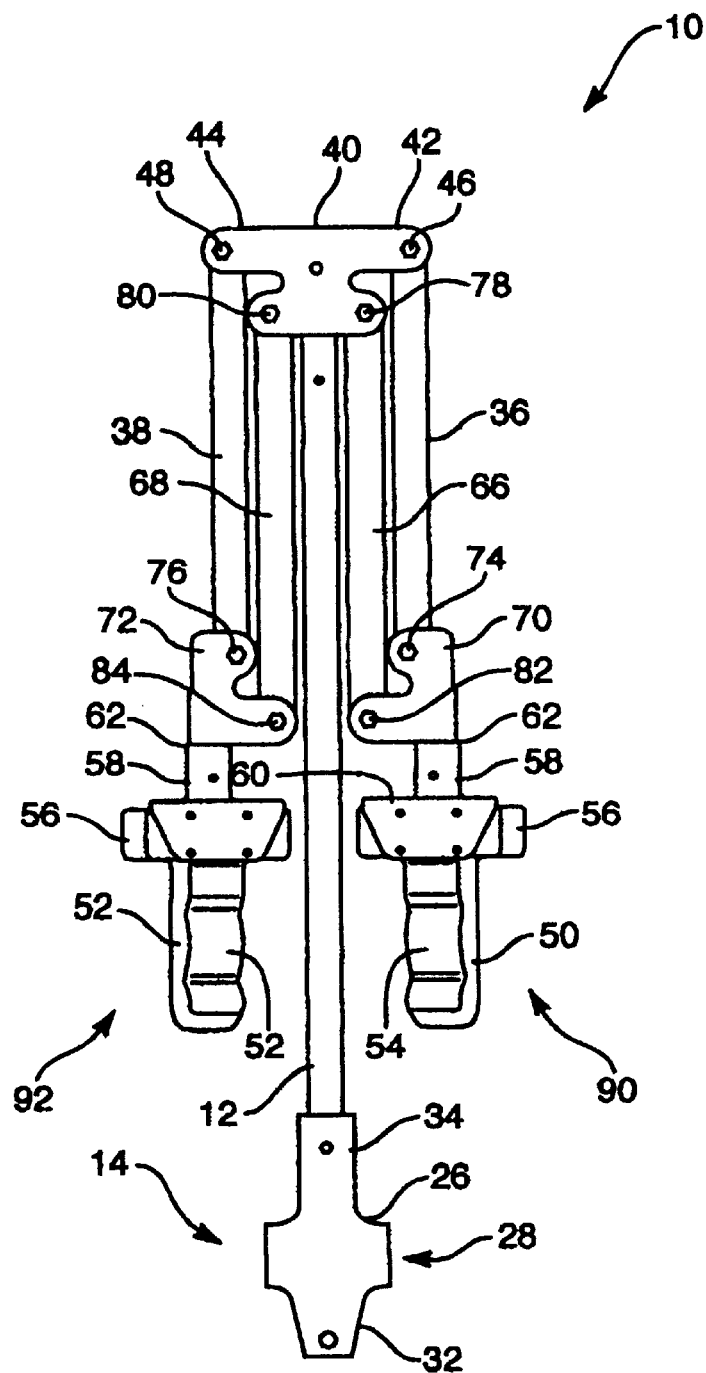
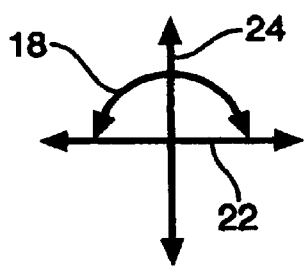
FIG. 9

DUAL-CONTROL STICK FOR AIRCRAFT

RELATED APPLICATIONS

This application claims priority to co-pending U.S. Provisional patent applications Ser. No. 60/145,689, filed on Jul. 26, 1999, entitled Dual-Control Stick for Aircraft, and Ser. No. 60/149,558, filed on Aug. 18, 1999, entitled Dual-Control Stick for Aircraft.

BACKGROUND

1. The Field of the Invention

This invention relates to aircraft control systems and, more particularly, to novel systems and methods for cockpit control levers for pitch and roll.

2. The Background Art

Aircraft move in several degrees of freedom. An aircraft can translate vertically, forward and backward, or side-to-side. Similarly, an aircraft can change orientation by rolling about a longitudinal axis, by pitching about a side-to-side axis, or yawing about a vertical axis through the center of gravity, or any other vertical axis. Thus, an aircraft may rise or drop, move forward or backward, move right or left, or rotate about a roll axis, pitch axis, or yaw axis.

In order to control an aircraft, one must know what type of aircraft is to be controlled. For example, some aircraft have a fixed wing. Other aircraft have a rotary wing. In rotary wing aircraft, some have power driving the rotary wing. Others have no power to the rotary wing. Similarly, an aircraft has control surfaces, such as ailerons, elevators, rudders, and so forth in order to orient the aircraft, and otherwise direct the aircraft to move in one of the available degrees of freedom.

Meanwhile, aircraft, whether fixed wing, helicopter, auto-gyro, or other variety, have some type of motive system such as an engine, propeller, combustion jet, or the like to drive the aircraft forward. Propellers or jets may provide forward thrust, a surface of an airfoil may provide lift, and various control surfaces may provide differentials in lift or load on a portion of an aircraft in order to rotate or translate all or part of the aircraft.

Typical controls for an aircraft include a throttle, as well as propeller, pitch angle, and the like for controlling the rate of advance of an aircraft in a forward direction. Similarly, ailerons may affect the roll of an aircraft. Typically, an elevator affects the pitch angle, while the rudder affects the yaw angle of an aircraft.

In rotor craft, control systems may be somewhat more complicated. Nevertheless, the same degrees of freedom apply. However, in a helicopter, for example, yaw is controlled by a tail rotor. Pitch is controlled to some extent by an airfoil in certain rotor craft, but is also controlled by the relationship between the rotor head and the fuselage of the aircraft. Similarly, whereas a fixed wing aircraft can roll by use of aileron positions, a rotor craft typically moves in a roll direction to some limited extent only, and then by affecting the angle between a rotor blade, or rotor head, sometimes defined in terms of a rotor disk, or the like, and the fuselage of the aircraft.

In aircraft control, a ubiquitous structure for pilot control of various aspects of an aircraft has been the stick. The stick is so ubiquitous as to be used in control systems for video games and other venues where multiple degrees of freedom may be called for simultaneously. One advantage of the conventional aircraft control stick is the ability to affect roll and pitch from a single control member simultaneously.

For example, pulling back on a stick (which typically pivots near the floor or some other mounting surface for the stick) effects a pitch angle, increasing the elevation of the nose with respect to the tail. Pushing a stick forward, pivoting the handle of the stick forward results in a nose down attitude tending to move the nose down with respect to the tail. In a fixed wing aircraft, forward and backward motion of the control stick typically operates on an elevator control surface in the tail of the aircraft.

Similarly, pivoting a stick to the left or right tends to roll an aircraft. In a fixed wing aircraft, tilting the stick to the left or right affects the positions of ailerons in the main wing surfaces. In a rotor craft, moving a stick control right or left typically affects the relative position of a fuselage with respect to a rotary wing. Thus, left to right typically controls roll angle, while forward and backward affects pitch angle of an aircraft.

Forward speed is typically controlled by a throttle and a propeller angle in a fixed wing aircraft, and by a combination of throttle and tilt of a rotor blade in a helicopter. Forward speed in an auto-gyro is controlled by a throttle setting to an engine, and the angle of pitch of the propeller, if properly driven, and the thrust of a jet, if jet driven.

Many aircraft have dual seating for pilot and co-pilot. Some aircraft may seat a pilot and copilot in tandem, one behind the other. Nevertheless, most aircraft seat a pilot and co-pilot side by side in a dual configuration. In a dual seating arrangement, both pilot and co-pilot have access to many or all of the same instruments. However, access to the same controls has been addressed in various ways. Many aircraft have dual control systems. For example, large, commercial, fixed-wing aircraft typically have two fill sets of controls, one in front of the pilot, another in front of the co-pilot.

In small aircraft, duplicating controls adds additional weight, complexity, additional parts to wear, and so forth. Moreover, in many smaller aircraft, a pilot and co-pilot sit shoulder-to-shoulder. Thus, access to instruments and many controls on a control panel may be readily available. However, typically, hand controls, such as the stick, can hardly be shared. The pilot or co-pilot needs a control stick in a particular location, preferably centered exactly in front of the individual. Duplicating controls can present several problems. For example, duplicate control sets may cause a difficulty if one of the persons in the seat beside a pilot is not a co-pilot. Having an extra control system to be bumped by a passenger is unsafe. Moreover, having a dual system of controls in front of a passenger can also be a waste of space. Moreover, having controls in front of a passenger creates problems for the passenger doing other activities. Thus, it would be desirable to have a system of controls that can be made optionally available to a pilot and co-pilot team, or a trainer and trainee, and yet stowed away when only a single flight-qualified operator is available or otherwise present.

What is needed is a control system that is readily deployable for use by either a pilot or copilot, and yet which has a configuration in which stowing the actuators dedicated to one person in a set of dual seats removes any difficulty of obstruction, safety, inappropriate or accidental actuation, or the like from the non-flight-qualified passenger.

What is needed is a fold-up system for aircraft stick controls to selectively render the control system readily accessible to a co-pilot, but stowed in a non-obstructing manner, safely for situations where a passenger occupies the second seat in a dual seating system.

BRIEF SUMMARY AND OBJECTS OF THE INVENTION

It is an object of the invention to provide an aircraft stick control system that can readily adapt to use by either a pilot or co-pilot. In certain embodiments, it is an object of the invention to provide selectively deployable control actuation for a pilot and co-pilot in a dual-seating arrangement.

Consistent with the foregoing objects, and in accordance with the invention as embodied and broadly described herein, an apparatus and method are disclosed, in suitable detail to enable one of ordinary skill in the art to make and use the invention. In certain embodiments an apparatus and method in accordance with the present invention including an upright mounted to an aircraft to move in directions corresponding to control of pitch and roll of an aircraft. In general, the apparatus may have movements in a longitudinal and lateral direction, as well as a transverse direction, where all directions are substantially orthogonal to one another. The apparatus may include yokes, pins, brackets, links, clevises, or other fastening means to connect to cables, links, electrical controls, or other devices for effecting pitch and roll control of an aircraft.

In certain embodiments, the apparatus may include a receiver, for holding or adjusting an upright, at a lower end thereof, with a head positioned on an upper end thereof. The head, or the upright directly, may support one or more cross beams. In certain presently preferred embodiments, at least one cross beam extends laterally in front of a pilot, while another extends from an upper end of the upright, or a head connected to an upright, in the opposite direction, to be positioned in front of a co-pilot.

The head, or the upper end of an upright directly may include clevises, yokes, pins, or other fastening mechanisms and pivot systems in order to connect the cross beams to the upright while maintaining certain degrees of freedom, and while failing to maintain (restricting) other degrees of freedom relative to one another. In one embodiment, a handle may fit at one end of a cross beam in front of an operator (pilot, co-pilot, etc.), with another at the opposite end of another cross beam, in front of another aircraft operator.

The cross beams preferably pivot independently from one another in order to stow down (or optionally up) beside the upright, the handle being positioned near the anchor (e.g. lower) end of the upright, and the control system being unavailable to an operator (e.g. co-pilot) on that corresponding side of the upright. Meanwhile, the cross beam may be pivoted at one end out away from the upper end or head of the upright, with the opposite end of the cross beam pivotally connected to the head or upper end of the upright.

In certain preferred embodiments, a handle may extend upwardly or downwardly from a distal end of a cross beam. Also, the upright may extend up from a floor or down from a ceiling. Thus, mirror image configurations with handles pointing up or down are contemplated. A cross beam may be pivoted such that the handle is bound to move in rigid body motion with respect to the upright in a pitch-control direction. Meanwhile, the handle may pivot with respect to the cross beam, or not pivot with respect to the cross beam, in a roll-control position. Nevertheless, in a roll-control position, the cross beam will pivot with respect to the upright, in order to maintain a clearance and prevent interference between the person of an operator, and the cross beam with its associated handle.

In some embodiments, a handle may have a grip for more easily engaging the fingers of a user against slipping from the handle. To this end, a hilt may also be part of a handle. In some embodiments, a hilt and retainer may sit at opposite ends of a handle, in order to provide more positive engagement between a hand of a user, and the handle.

A handle may connect to the cross beam by a bracket. The bracket may pivot on a shaft, or may be fixed to move rigidly with respect to the cross beam. In certain embodiments, brackets may rotate on shafts or journals in order to angle as needed to more comfortably engage a right or left hand of a user. Since pivoting a handle about its own approximately vertical axis, such relative motion may be desirable. Nevertheless, some individuals may feel more comfortable having more rigidity in the control, and thus a more direct feel for the position of the upright, which fills the position largely of a conventional stick in an aircraft.

Nevertheless, the upright is positioned near the center between the seats of two operators. By contrast, a conventional stick would be mounted directly in front of, and centered on the seat of each operator.

In certain embodiments, a single cross beam may be replaced by a pair of cross beams. For example, a parallelogram formed by two cross beams pinned to the upright, or a head on an upright, may close at a distal end with a link pivotably pinned to parallel the upright, but at an opposite end of the twin cross beams. Accordingly, an orientation of the handle fixed to the link may effectively replicate the angle, or some relationship with the angle of the upright in a roll-control position. In one presently preferred embodiment, pins may extend essentially forward through cross beams, in order to provide a degree of freedom of the cross beams to move in a plane through the upright in all pitch-control attitudes.

Meanwhile, the parallelogram structure may permit positioning of a handle in substantially any vertical height, with respect to an end of the upright, with only modest change in the side-to-side positioning of the handle. That is, a parallelogram could be collapsed against the upright, stowing the handle parallel thereto, with the parallelogram cross beams also parallel to the upright. Meanwhile, a handle can be moved for deployment away from the upright, remaining parallel thereto. Upon deployment, the handle may be drawn away from the upright, typically from a position near a lower end thereof, remaining parallel thereto, while the parallel cross beam pivot from a stowed orientation substantially parallel to the upright, and out of the way of a user, out to a substantially horizontal, laterally extending position supporting the handle directly in front of a user.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 5 is a top plan view of the apparatus of FIGS. 1–4;

FIG. 9 is a front elevation view of the apparatus of FIGS. 6–8, illustrating both control systems placed in a stowed position;

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 16, is not intended to limit the scope of the invention. The scope of the invention is as broad as claimed herein. The illustrations are merely representative of certain, presently preferred embodiments of the invention. Those presently preferred embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only by way of example, and simply illustrates certain presently preferred embodiments consistent with the invention as claimed.

Figure 1:
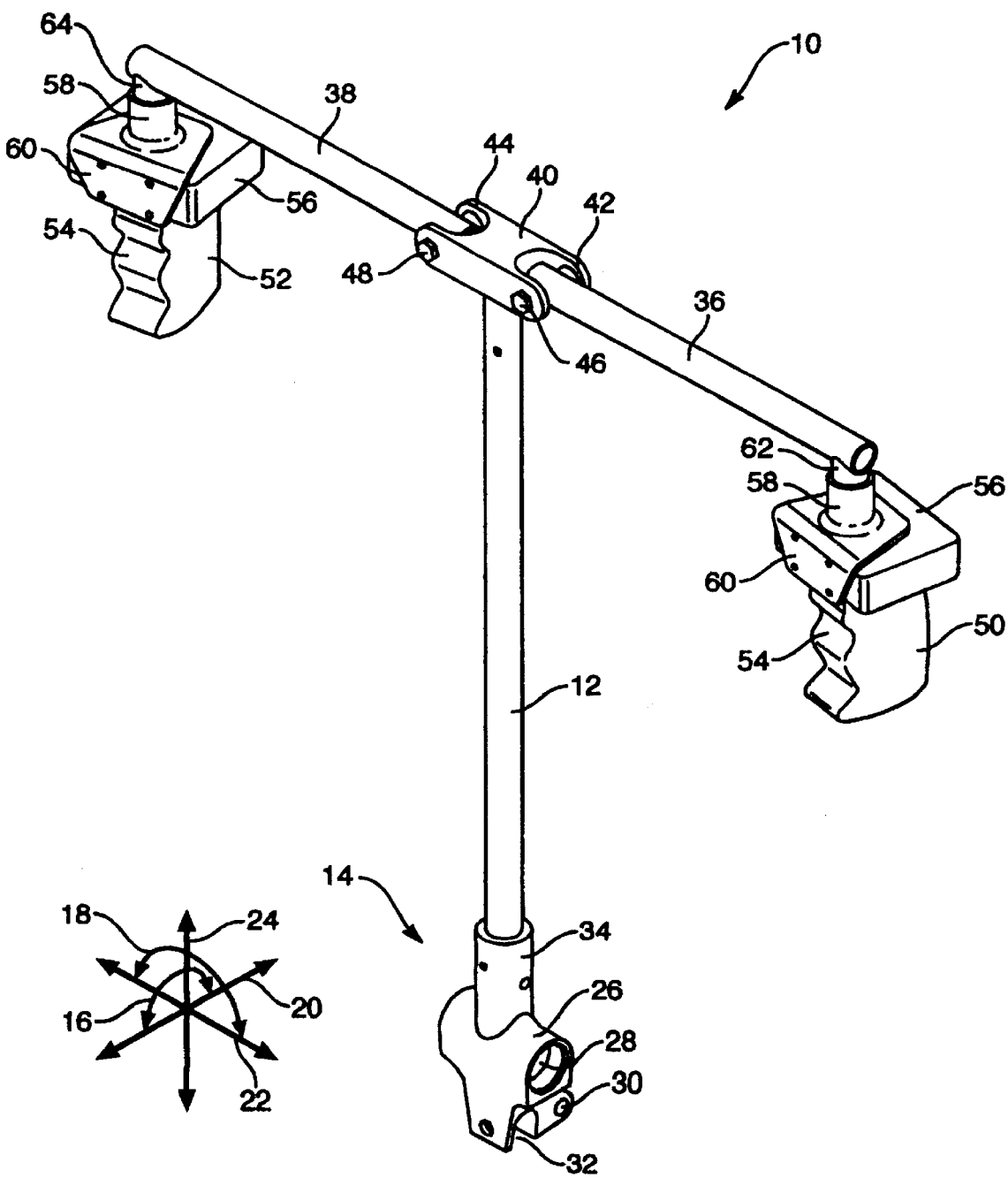
FIG. 1 is a perspective view of one embodiment of a control system in accordance with the invention, relying on a single cross beam for each operator.
Figure 2:
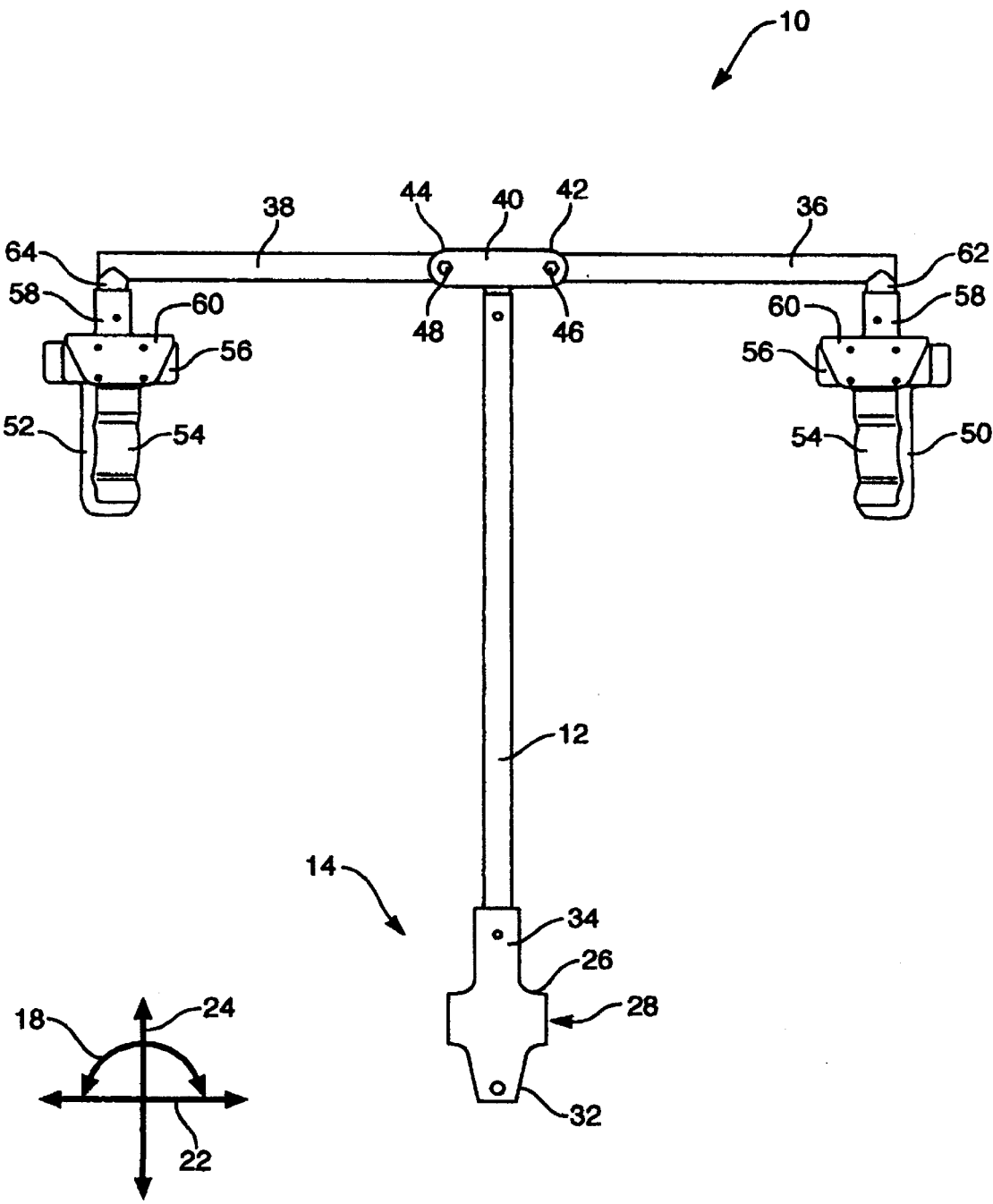
FIG. 2 is a front elevation view of the apparatus of FIG. 1.

An apparatus 10 may operate to perform the functions of a conventional stick for aircraft flight control. In certain embodiments, an upright 12 may be formed of any suitable shape to extend from substantially a floor area of an aircraft, at a lower end and up to an appropriate height for engagement by a user (pilot) at an upper end. In the embodiment of FIG. 1, a mount 14 may facilitate movement of the upright 12 in a pitch direction 16 and a roll direction 18. In some embodiments, the motions may be translating motions. Nevertheless, in most practical embodiments, each of the pitch direction 16 and roll direction 18 for movement of the upright 12 represents a pivoting about a longitudinal axis 20, lateral axis 22, or transverse axis 24. Alternatively, the axes 20, 22, 24 may also be referred to as a longitudinal direction 20, a lateral direction 22, and a transverse direction 24.

Referring to FIG. 1, a pivot sleeve 26 may receive a old axle or the like in order to provide pivoting motion of the upright 12. In other embodiments, the pivot sleeve may actually be a pivot axle mounted in pillow blocks, bearings, bushings, or the like. Nevertheless, some type of a pivot mechanism 26 is typically required at or near a lower end of the upright 12. Accordingly, the pivot mechanism 26 provides an orientation of the upright 12 for moving in a pitch-control direction.

An aperture 28 in the pivot sleeve may receive bearings, an axle, or the like. Alternatively, the pivot mechanism 26 may be an axle rather than a sleeve, in which event, some type of aperture 28 would be formed in a corresponding system associated with an aircraft in order to mount the pivot mechanism therein.

In selected embodiments, a pitch connection 30 may operate as a yolk, an ear, or the like, typically perforated to receive a fastener in order to draw another link connected to a pitch control system of an aircraft. In the illustrated embodiment, the pitch connection 30 is a yolk, and the roll connector 32 is also a yolk or clevis. A system using an ear or other member extending from the mount 14 in order to draw various types of hardware required, may be substituted for the clevis or yolk-type structures of the pitch connector 30 and the roll connector 32. In general, the roll connector 32 and pitch connector 30 are positioned to provide a substantial leverage advantage to the upright 12 against the forces exerted on various control mechanisms or control services of an aircraft. Accordingly, the exact configuration of the pitch connector 30 and roll connector 32 are not as critical as the proper design or the function thereof Also, a trim mechanism may be provided to stabilize a position, or bias a position of a control link with respect to the pitch connector 30, roll connector 32, or both.

In one embodiment, a receiver 34 may receive the upright 12 therein. Again, the male/female relationship of various parts, can be reversed without departing from the invention. A receiver 34 may be securely fastened to one end of the upright, while crossbeams 36, 38 are connected to an opposite end (upper end) of an upright 12. Nevertheless, since rotor craft often rely on pitch control and roll control directly coupling a position of a rotor head to a fuselage, the entire apparatus 10 may be viewed upside down with respect to FIG. 1, with the upright 12 extending down through a cockpit from a rotor head. In such an embodiment, a user may expect the handles 50 to extend downward from the crossbeams 36, 38, which in turn connect to an upright 12 extending downward from the top of a cockpit of a rotor craft.

In certain embodiments, the crossbeams 36, 38 may connect directly to the upright 12. Nevertheless, in the illustrated embodiment, a head 40 may provide a transition by forming a yolk 42 or capturing the crossbeam 36 in a pivoting relationship. Meanwhile, a yolk 44 or clevis 44 may pivotally connect to a crossbeam 38. In general, the freedom of pivot of the crossbeams 36, 38 may be a matter of personal selection. Some persons may prefer a comparatively snug, friction fit such that the crossbeams 36, 38 stay where placed. Others may prefer that the crossbeams 36 rely on the specific positioning that a user may impose.

Referring to FIG. 1, each of the pivots 46, 48 may be fashioned in one of numerous methods. Again, the male/female relationship between the yolks 42, 44 and the crossbeams 36, 38, respectively may be reversed.

Eventually, a user (pilot) needs a handle 50 positioned appropriately for controlling an aircraft. In certain selected embodiments, a handle 50 may be deployable to position directly in front of, and centered, more or less, for use by one pilot. Another handle 52 may similarly position in front of another pilot. If desired, a contouring 54 or a grip 54 may provide more affirmative movement of the handle 50, 52 by a user, by engaging the fingers of a user or positively asserting directions. Accordingly, a grip 54 may be a desirable feature of each handle 50, 52. Nevertheless, a hilt 56 may serve as an affirmative limit on motion of a hand with respect to each handle 50, 52. Accordingly, a hilt 56 may be provided at each end of a handle 50, 52, thus forming a hilt and a retainer for assuring positioning of a hand by the user on a handle 50, 52.

In certain embodiments, a sleeves 58 may mount a brackets 60 to shafts 62, 64. In certain embodiments, the shafts 62, 64 may connect to the crossbeams 36, 38 in rigid relation. In other embodiments, the shaft 62, 64 may be free to move in the plane define by the crossbeams 36, 38 and the upright 12. The bracket 60 along with a corresponding shaft 62, 64 with a respective crossbeam 36, 38 may connect in any suitable fashion to a handle 50, 52 or hilt 56, as necessary. In practice, in one embodiment, the shafts 62, 64 are rigid with respect to the crossbeams 36, 38 the sleeves 58 may still be pivotable, or rigidly fixed with respect to the shafts 62, 64.

In an embodiment where the shafts 62, 64 and sleeves 58 are rigidly connected to provide no relative motion between the crossbeam 36, 38 and the respective handle 50, 52, the handle 50, 52 may be positioned substantially in front of a user with a crossbeam 36, 38 substantially horizontal. Tilting of the crossbeam 36, 38 may then result in an awkward positioning of the handle 50 52, respectively, according to a user's needs. In certain embodiments, a user may not object to the relative tilt of the handle 50, 52 in use.

Since each of the pivots 46, 48 provides only motion in the plane defined by the cross beams 36, 38 and the upright 12, the pitch-control direction of movement of the upright 12 may move in a substantially rigid body motion with respect to all members defined by the plane of the cross beams 36, 38 and the upright 12. Accordingly, each of the handles 50, 52 may move the upright 12 in the pitch-control direction in a substantially fixed or rigid-body type of motion.

Nevertheless, the position of the respective handle 50, 52 of a user may effectively translate (with a slight deflection of the translation path as affected by the pivoting motion of the upright 12) and may effectively move only in translation, having the effect of pivoting the upright 12 in a roll-control direction 18. Thus, handles 50, 52 configured as illustrated in FIG. 1 may be quite practical, very simple, and yet divide the need for rigid-body, relative motion between the handles 50, 52 and the upright 12 in the pitch-control direction 16, while accommodating the lack of any constraint, other than for imposing a roll-control motion 18 on the upright 12.

Referring to FIGS. 1–6, a cross beam 36, 38 may be formed to be of a particularly strong and stiff cross section in order to minimize deflection of the handle 50, 52 with respect to the upright 12. Thus, in a pitch-control direction 16 a handle 50, 52 moves in substantially rigid-body motion with respect to the upright 12. In reality, a user may actually pivot a cross beam 36, 38 about a respective pivot 48 without a cross beam 36, 38 or handle 50, 52 moving out of the plane defined by the cross beams 36, 38 and the upright 12.

The cross beams 36, 38 and the upright 12 need not be in a single planar alignment. A head 40 may be constructed to provide offset in any direction desired, and particularly to place the upright 12 longitudinally 20 ahead of or behind a straight alignment position.

Figure 3:
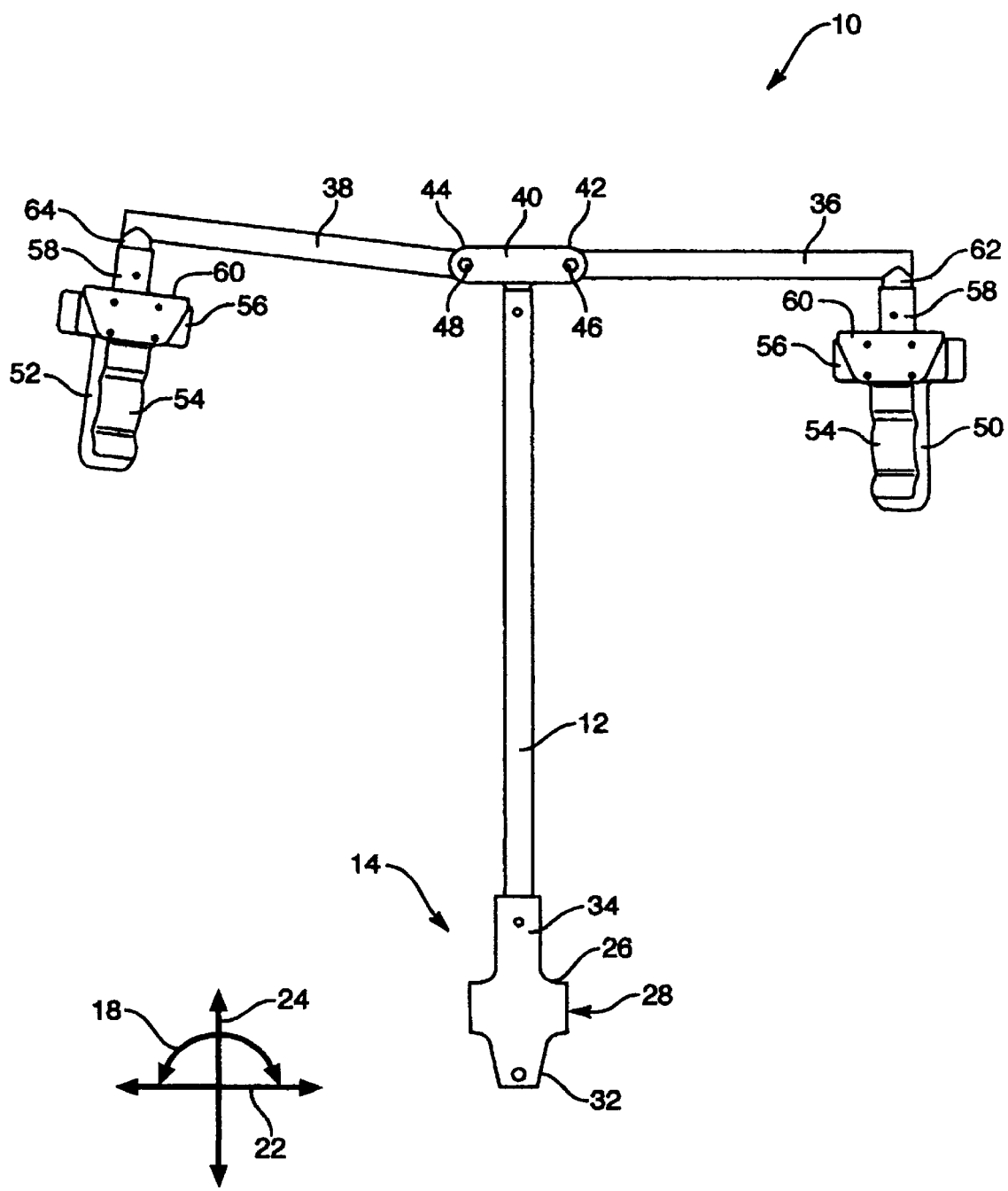
FIG. 3 is a front elevation view of the apparatus of FIG. 2, illustrating a rigidly mounted axis of a handle with respect to a cross beam, and the cross beam pivoted with respect to the upright.

Referring to FIG. 3, while continuing to refer generally to FIGS. 1–6, the cross beam 38 may be deflected to a comfortable position for a user. Meanwhile, shafts 62, 64 are fixedly secured to the cross beams 36, 38, respectively. As a practical matter, the sleeves 58 may be fixed to the shafts 62, 64. Alternatively, the sleeves 58 and the handles 50, 52 may be rigidly fixed with respect to one another through the brackets 60. Nevertheless, in certain embodiments, the sleeve 58 and its associated bracket 60 may move in rigid-body motion with respect to the handles 50, 52, yet pivot about the shafts 62, 64, respectively.

Figure 4:
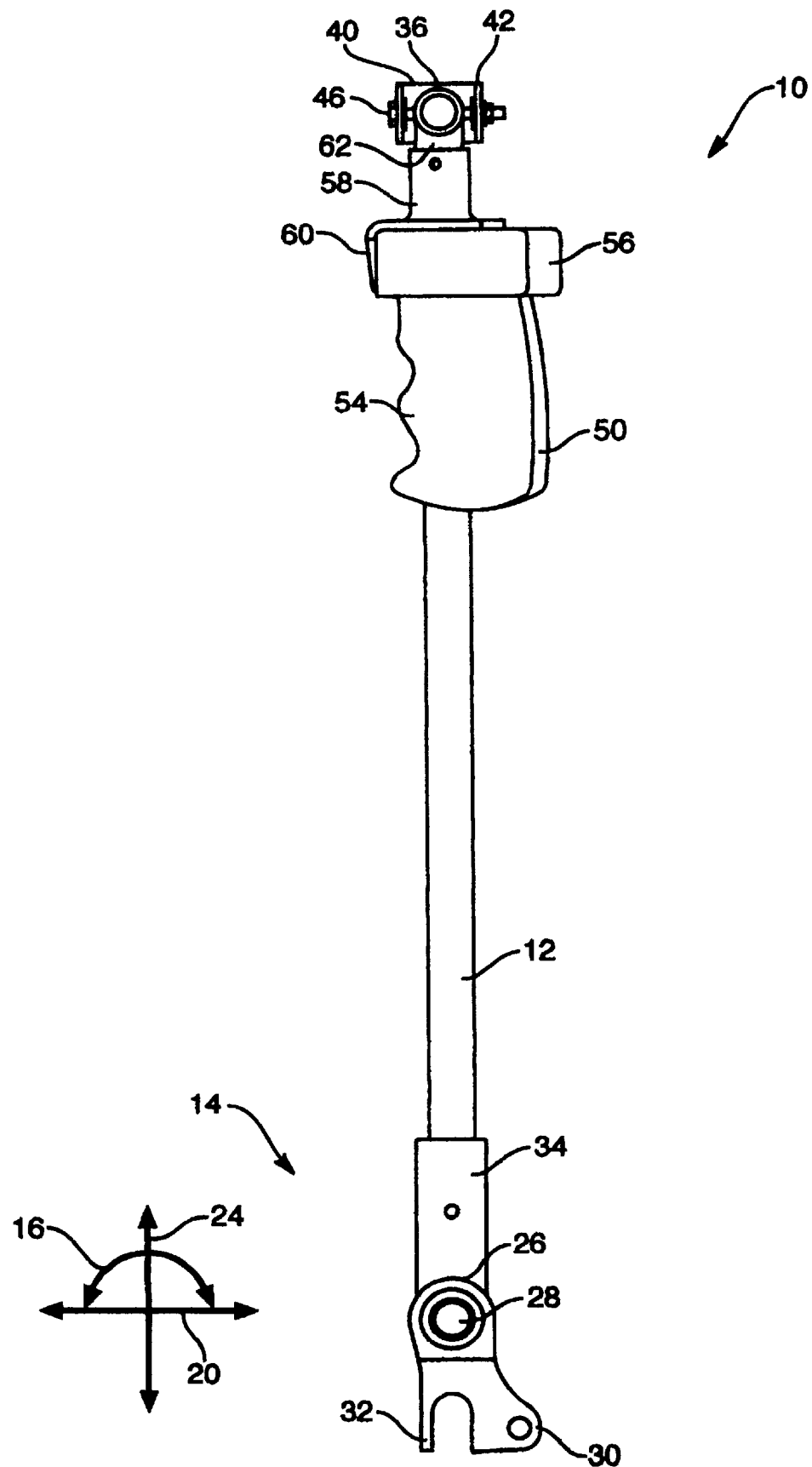
FIG. 4 is a side elevation view of the apparatus of FIGS. 1–3.

Referring to FIG. 4, the grip 54 is formed to provide stability of the handle 50 in a grip of a user. Similarly, the hilt 56 provides a mounting surface and a stop securing the position of a hand of a user. A similar stop 56 or hilt 56 may be positioned as a lower end of the handle 50, as well.

In certain embodiments, the pitch connector 30 and roll connector 32 may be clevis-type attachment mechanisms for drawing linkages controlling the pitch-control structure and the roll-control structure, respectively of an aircraft. Many different types of structures may be substituted for performing the connecting function. Similarly, numerous types of pivot structures 26 may exist. Nevertheless, in certain presently preferred embodiments, the pitch structure 26 may be a sleeve 26, mounted in a yoke to permit movement of the upright 12 in a roll-control direction 18.

Referring to FIG. 5 and generally to FIGS. 1–4, the handles 50, 52 may be tilted at any particular orientation with respect to the cross beams 36, 38. In certain embodiments, if the sleeves 58 are fixed with respect to the shafts 62, 64 preventing pivoting therearound, then each of the handles 50, 52 may be positioned to comfortably aim toward a particular hand of a user.

One may also note that the pivots 46, 48 support torques in several directions. Particularly, pivots 46, 48 must be robust enough to support or resist twisting motions that the handles 50, 52 may impart into the cross beams 36, 38, respectively, about a central axis of the cross beams 36, 38, respectively. Likewise, the pivots 46, 48 support the levering action of each cross beam 36, 38 as a result of the pushing and pulling forces in the pitch-control direction 16.

Figure 6:
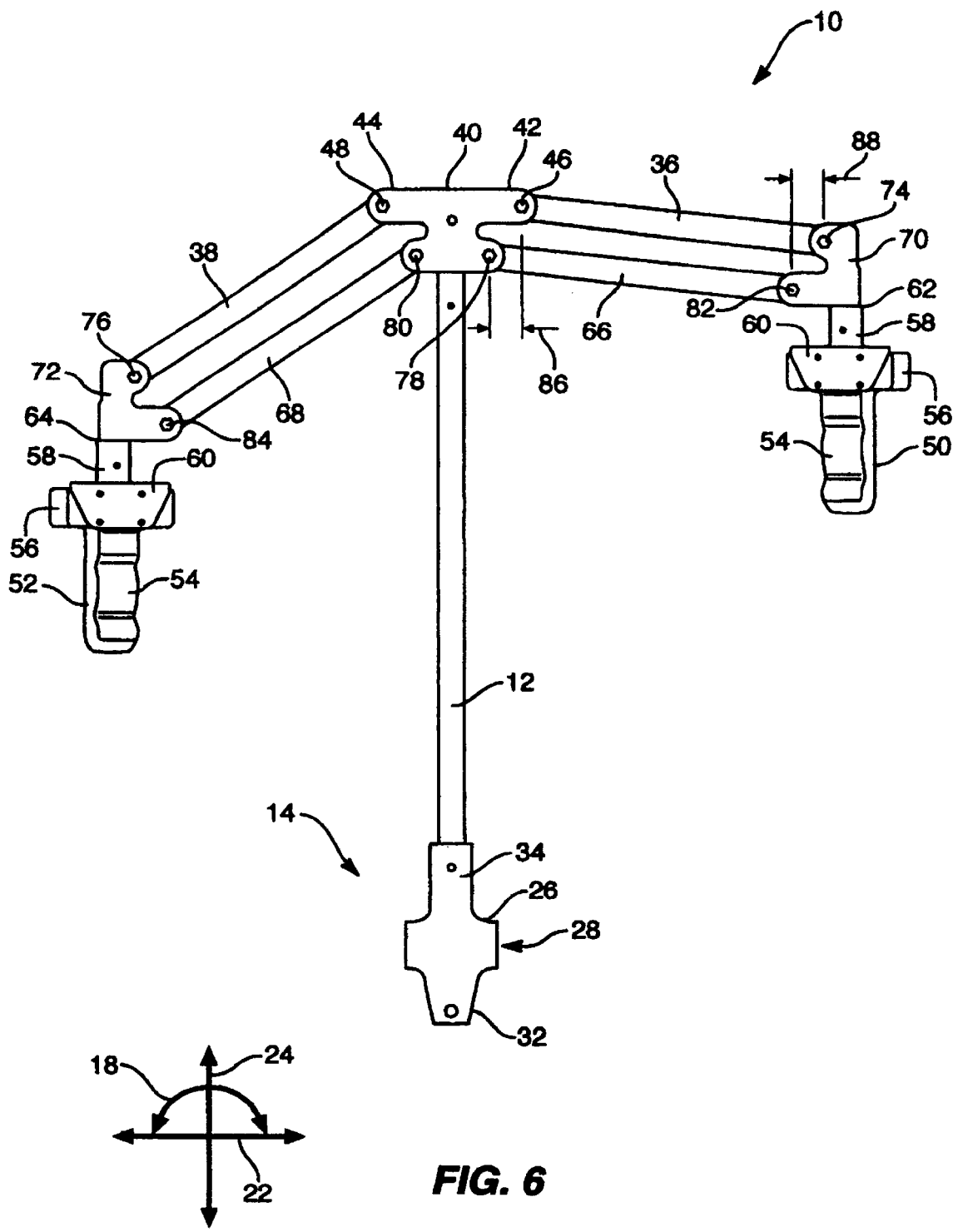
FIG. 6 is a front elevation view of an alternative embodiment of the apparatus of FIG. 1, relying on double, parallel cross beams for each operator, thus maintaining the axis of the handle parallel with the axis of the upright at all times.

Referring to FIG. 6, while continuing to refer generally to FIGS. 1–16, cross beams 36, 38 may be augmented by lower cross beams 66, 68. The lower cross beams 66, 68 provide additional bearing distance between ends of a link 70, 72 connecting the upper cross beams 36, 38, respectively with the lower cross beams 66, 68. Accordingly, pivots 74, 76 connect the links 70, 72, respectively, to the upper cross beams 36, 38. Meanwhile, pivots 82, 84 connect the respective lower cross beams 66, 68 to the links 70, 72. In certain presently preferred embodiments, an offset 86 between the pivots 46, 78 changes the parallelogram formed by the head 40, link 70 and the cross beams 36, 66. Nevertheless, the offset 86 supports positioning the cross beams 36, 66 in a location parallel to the upright 12, in order to put the handle 50 in a stowed position. A corresponding offset 88 may exist between the pivots 74, 82. Similarly, in one presently preferred embodiment, the apparatus 10 is symmetrical. Accordingly, the right upper cross beam 38 and lower cross beam 68 may operate similarly with the head 40 and link 72.

Figure 7:
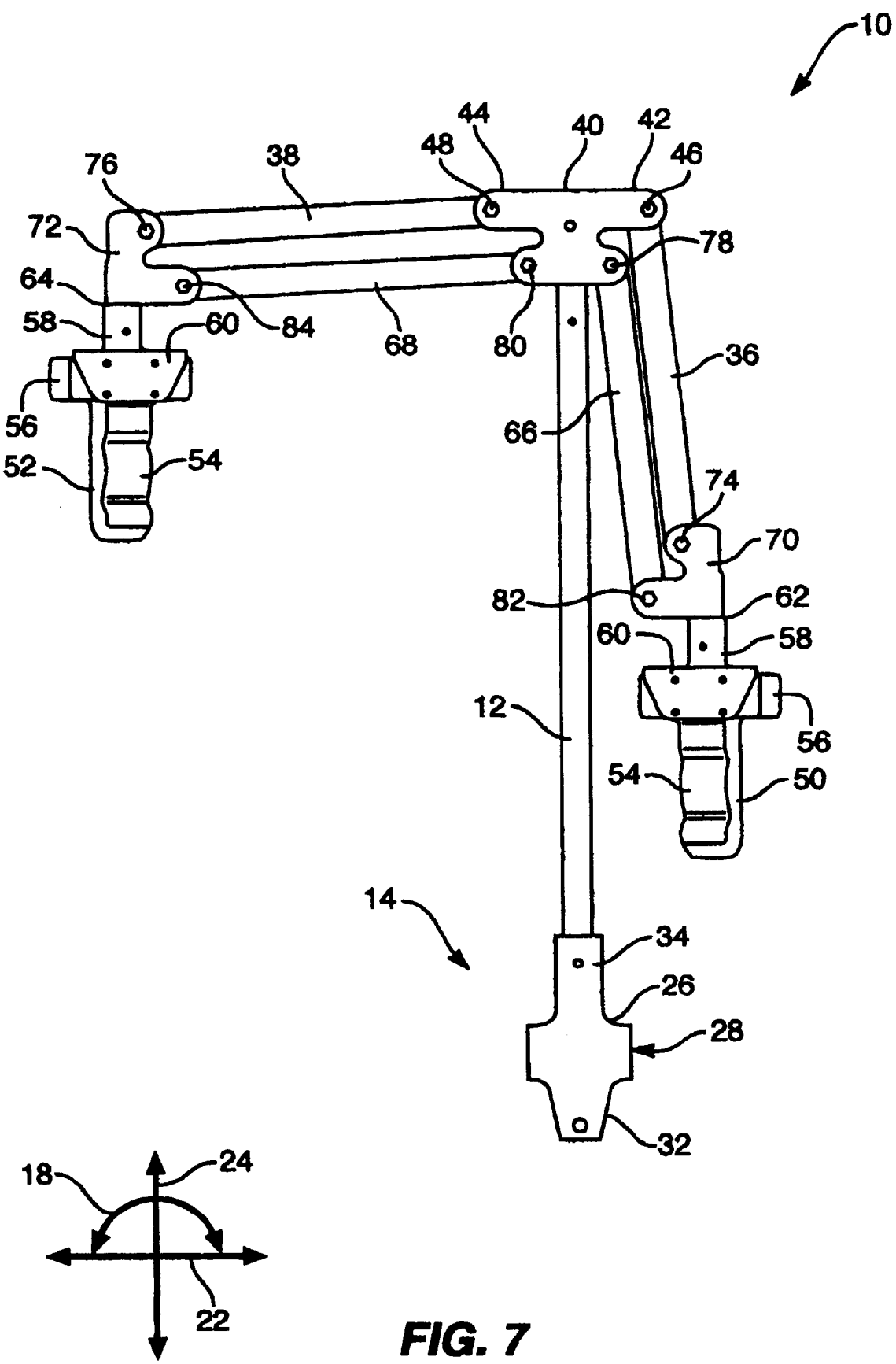
FIG. 7 is a front elevation view of the apparatus of FIG. 6, illustrating one control system positioned in a defended positioned.
Figure 8:
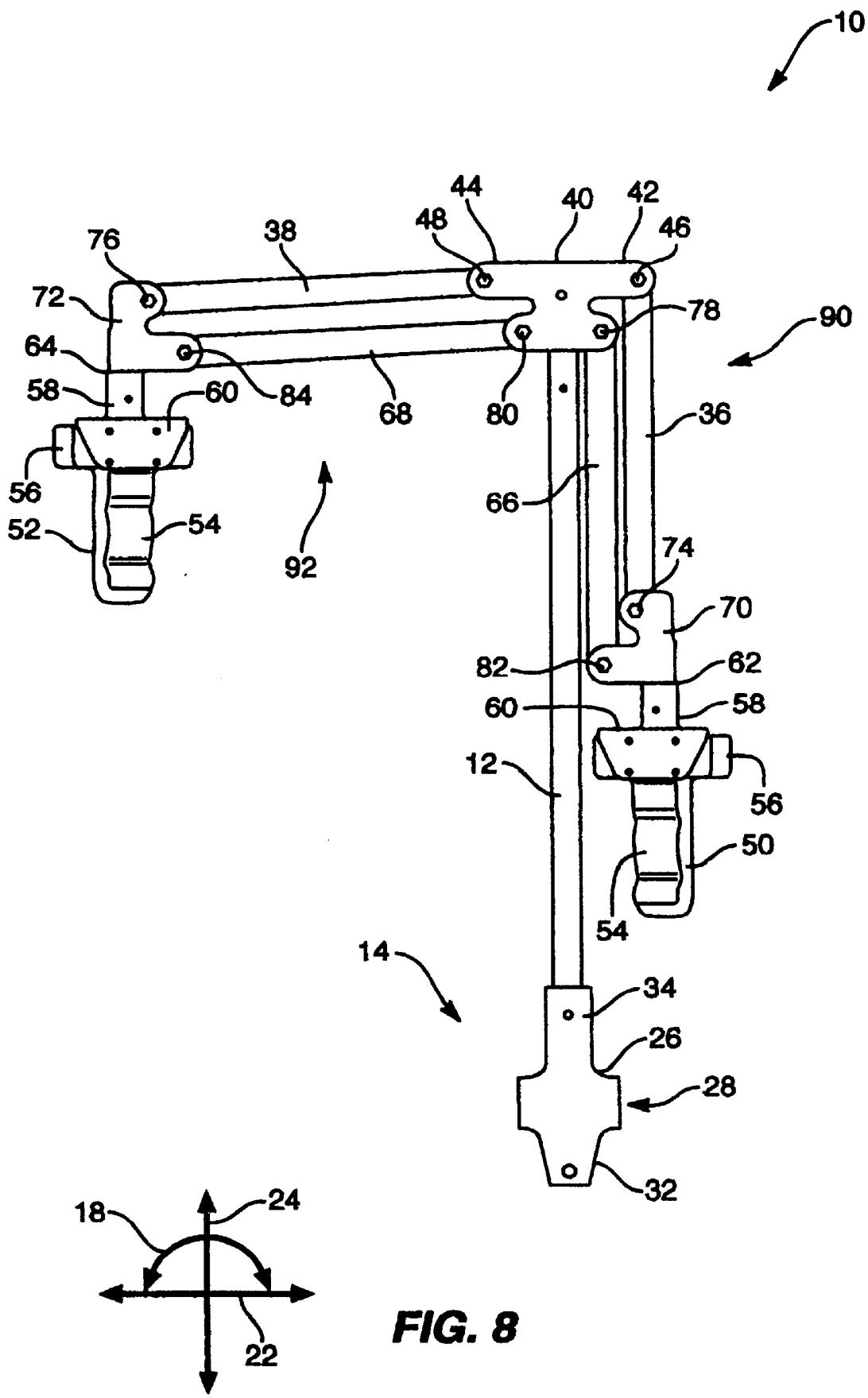
FIG. 8 is a front elevation view of the apparatus of FIGS. 6–7, illustrating one control in a stowed position.

Referring to FIGS. 7–8, the cross beams 36, 66 are lowered, each operating at the same radius, and thus realigning the link 70 to nearer a vertical location, and ultimately a parallel position with respect to the upright 12, as illustrated in FIG. 8. In the orientation of FIG. 8, one user is in a position to control the aircraft. The other user seated in a dual-seating arrangement is not able to use the control. Nevertheless, the control handle 50 may be rapidly deployed from the stowed position. Meanwhile, the entire cross beams 36, 66 and handle 50 form, with the link 70 and head 40 including pivots 46, 74, 78, 82 and bracket 60, a single control assembly 90 that is easily deployable, stowable, operable, accessible and adjustable for a user.

Referring to FIG. 9, both control assemblies 90, 92 may be placed in a stowed position for exit or entry of a user with respect to an aircraft. Particularly with small aircraft, a common joke among pilots is that one does not get into an aircraft so much as one puts it on as an article of clothing. Space is at a premium. Instrumentation and controls occupy a minimum of space. Accordingly, the cockpit size is controlled by the envelope required for the comfort of a user (pilot). Thus, it is a considerable advantage to a pilot that the dual control systems 90, 92 of the apparatus 10 can both be stowed for entry and exit of an aircraft.

Figure 10:
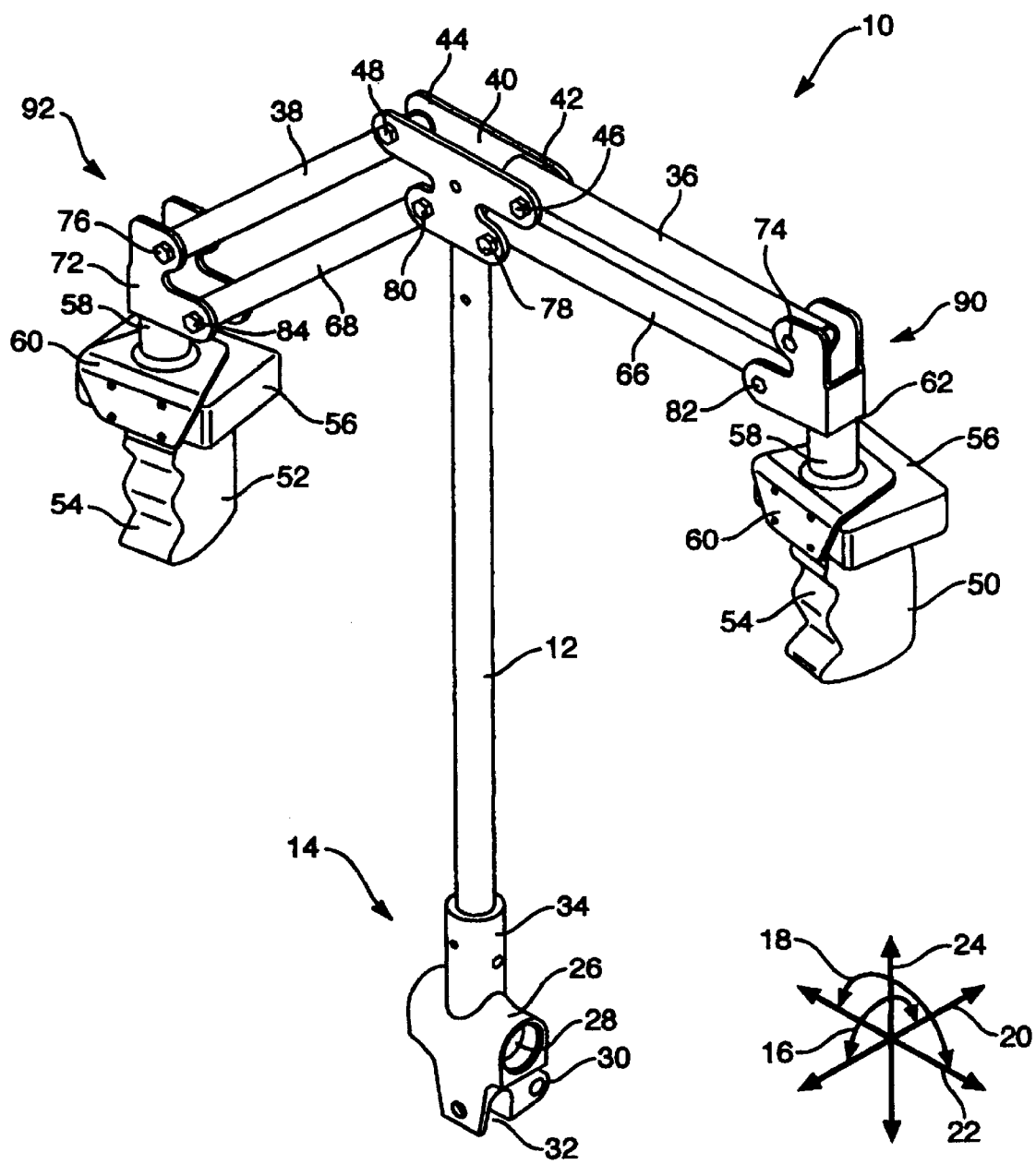
FIG. 10 is a perspective view of the apparatus of FIGS. 6–9, illustrating two controls, each in a deployed position and each at a different respective height.

Referring to FIG. 10, each of the control assemblies 90, 92 is separately adjustable to a height comfortable for a particular user. The orientation of each of the handles 50, 52 remains parallel to the upright 12, or in whatever other orientation may be desired. That is, the handles 50, 52 may be canted slightly with respect to the upright 12 in certain embodiments. Also, the upright 12 may not be straight. In certain embodiments, the upright 12 may have a goose neck, may be bent, or otherwise may be formed to accommodate the shape of the equipment, seating, persons, etc. occupying a cockpit with the apparatus 10.

Figure 11:
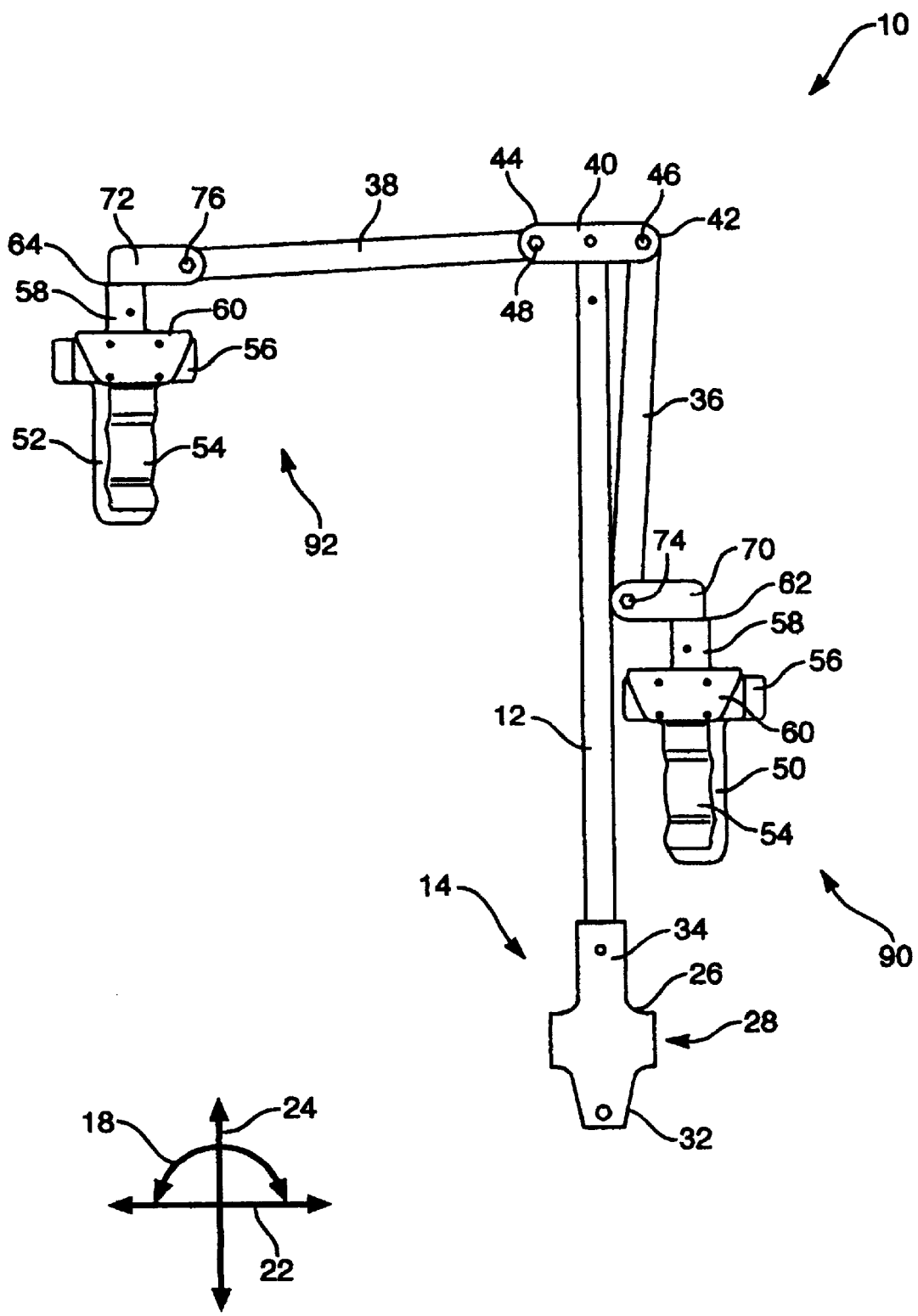
FIG. 11 is a front elevation view of an alternative embodiment of the apparatus of FIG. 1, providing additional pivotable connection between the handle and the cross beam in a single-cross beam type of apparatus.
Figure 12:
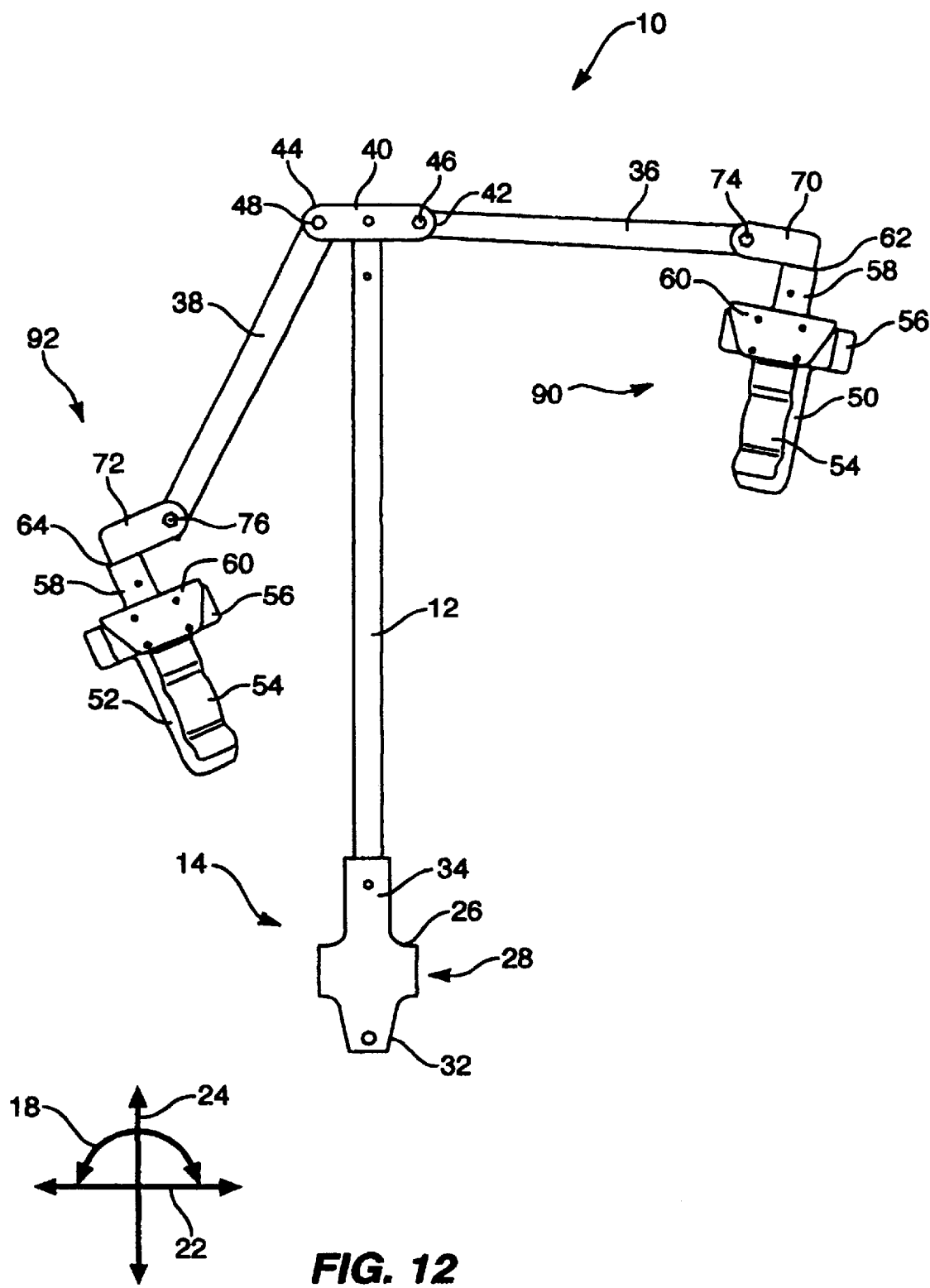
FIG. 12 is a front elevation view of the apparatus of FIG. 11, showing one control near the stowed position, and the other control near the deployed position.
Figure 13:
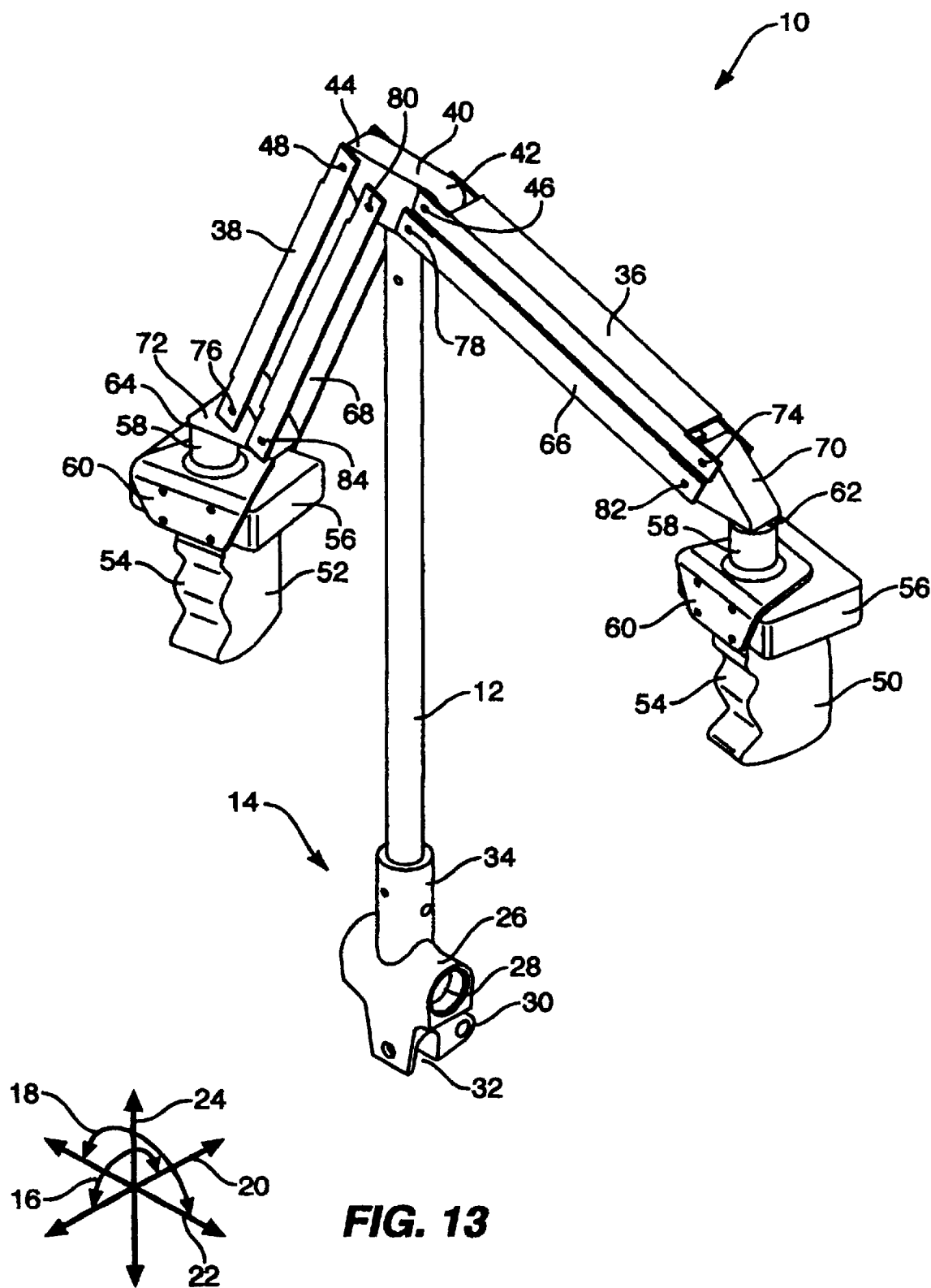
FIG. 13 is a perspective view of an alternative embodiment of an apparatus relying on a rectangular-shaped cross beam, relying on dual beams in parallel fashion, and providing a yoke on the beam for capturing the head and the handle bracket, rather than having a head as a clevis surrounding a cross beam.

Referring to FIGS. 11–12, while continuing to refer generally to FIGS. 1–16, a link 70, 72 may connect to a respective cross beam 36, 38 without a requirement for parallel motion of the handles 50, 52 with respect to the upright 12. Lacking any lower cross beam, the links 70, 72 have additional freedom to move in the roll direction 18.

This embodiment requires additional awareness, and strength or effort on behalf of a user. That is, each of the pivots 74, 76 does not support rigid-body motion between the respective links 70, 72 and the corresponding cross beam 36, 38. Accordingly, forces applied by a user on the handle 50, 52 in a lateral direction 22 or in a roll direction 18 will not necessarily bring about the desired result of moving the head 40 of the cross beam 12 in a roll direction 18. Actually a user may maintain a grip on a handle 50, 52 and exert a force in a lateral direction 22, ignoring the tendency of the handle 50, 52 to twist in a roll direction 18, somewhat defeating the force and motion in a lateral direction 22.

Nevertheless, the handle 50, 52 must eventually come to an equilibrium, drawing the cross beam 36, 38 in a lateral direction 22 and effecting a tilting of the upright 12 in a roll direction 18. One should be aware that the pivot sleeve 26 typically rests in a yoke or other system that permits pivoting of the upright 12 in a roll-control direction 18. One may also note that to the extent that forces are sufficiently small that a user can resist a twisting motion of the handle 50, 52, then a user can maintain the handle 50, 52 parallel to the upright 12, if desired.

Referring to FIG. 12, one advantage of the apparatus of FIGS. 11–12 is that the stowed position of the handles 50, 52, with respect to the cross beams 36, 38 can be different in a stowed orientation than in a deployed orientation. Thus, like the apparatus of FIG. 1, the apparatus of FIGS. 11–12 is comparatively simple and light. Unlike the apparatus of FIG. 1, the apparatus of FIGS. 11–12 compacts into a comparatively small envelope near the upright 12. Unlike the apparatus of FIGS. 6–10, the apparatus of FIGS. 11–12 has fewer structural members. However, those fewer structural members result in less automation of the maintenance of the hand orientations of the handles 50, 52 with respect to the cross beams 36, 38 and the upright 12.

In certain embodiments, the upright 12 may also be formed as part of a parallelogram operating like the cross beams 36, 66 of FIG. 6. However, the question of strength, space, weight, etc. may dictate any particular design in accordance with the invention in order to meet the most significant criteria.

Referring to FIGS. 13–16 while continuing to refer generally to FIGS. 1–16, an apparatus may be formed by relying on cross beams 36, 38, 66, 68 having rectangular cross sections. The cross beams 36, 38, 66, 68 may be tubular in cross section, or channeled, as illustrated. The pivots 46, 48, 74, 76, 78, 80, 82, 84 may operate to treat either a cross beam 36, for example, or a link 70 as the male or female member of a clevis-type connection. Thus, in the embodiment of FIG. 13, the cross beam 36 is the female member.

Nevertheless, the head 40 and link 70 may be formed to be the female members as illustrated in FIGS. 6–10. If the cross beams 36, 38, 66, 68 are formed as fully closed tubular cross sections, then they may be best served by acting as the male members in a clevis connection to the respective head 40, and links 70, 72.

As discussed, certain embodiments permit the sleeves 58 to pivot about the shafts 62, 64. In an embodiment such as the structures illustrated in FIGS. 6, 13, the additional stability of the lower cross beams 66, 68 may argue for additional degrees of freedom of the sleeves 58 and handles 50, 52 with respect to the shafts 62, 64. Nevertheless, a rigidly mounted sleeve 58 and bracket 60, fixed with respect to the shafts 62, 64, is also a workable embodiment.

Figure 14:
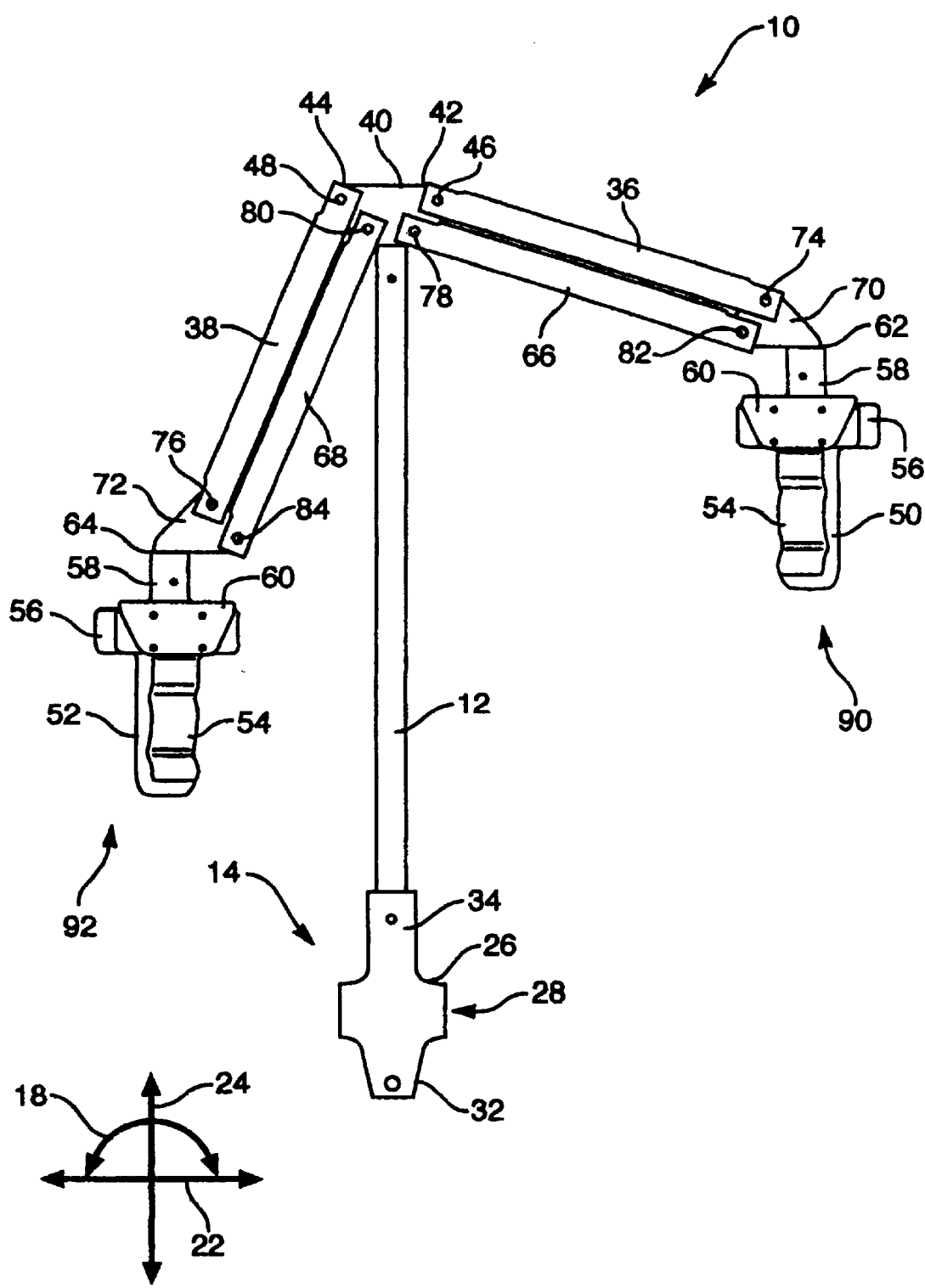
FIG. 14 is a front elevation view of the apparatus of FIG. 13, illustrating one handle in a deployed position and one handle approaching a stowed position.
Figure 15:
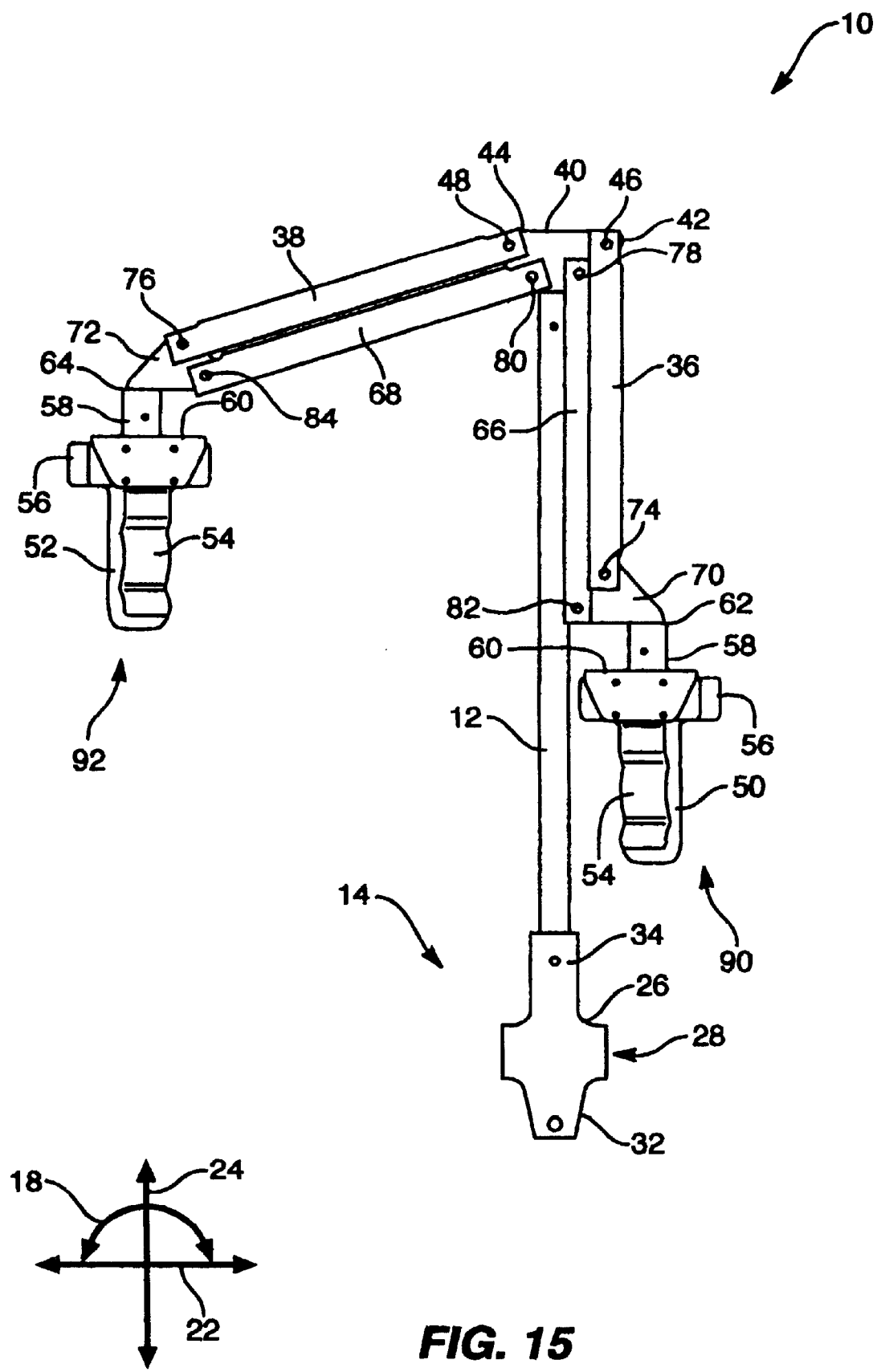
FIG. 15 is a front elevation view of the apparatus of FIGS. 13–14, illustrating one handle in a deployed position, and one handle in a stowed position.
Figure 16:
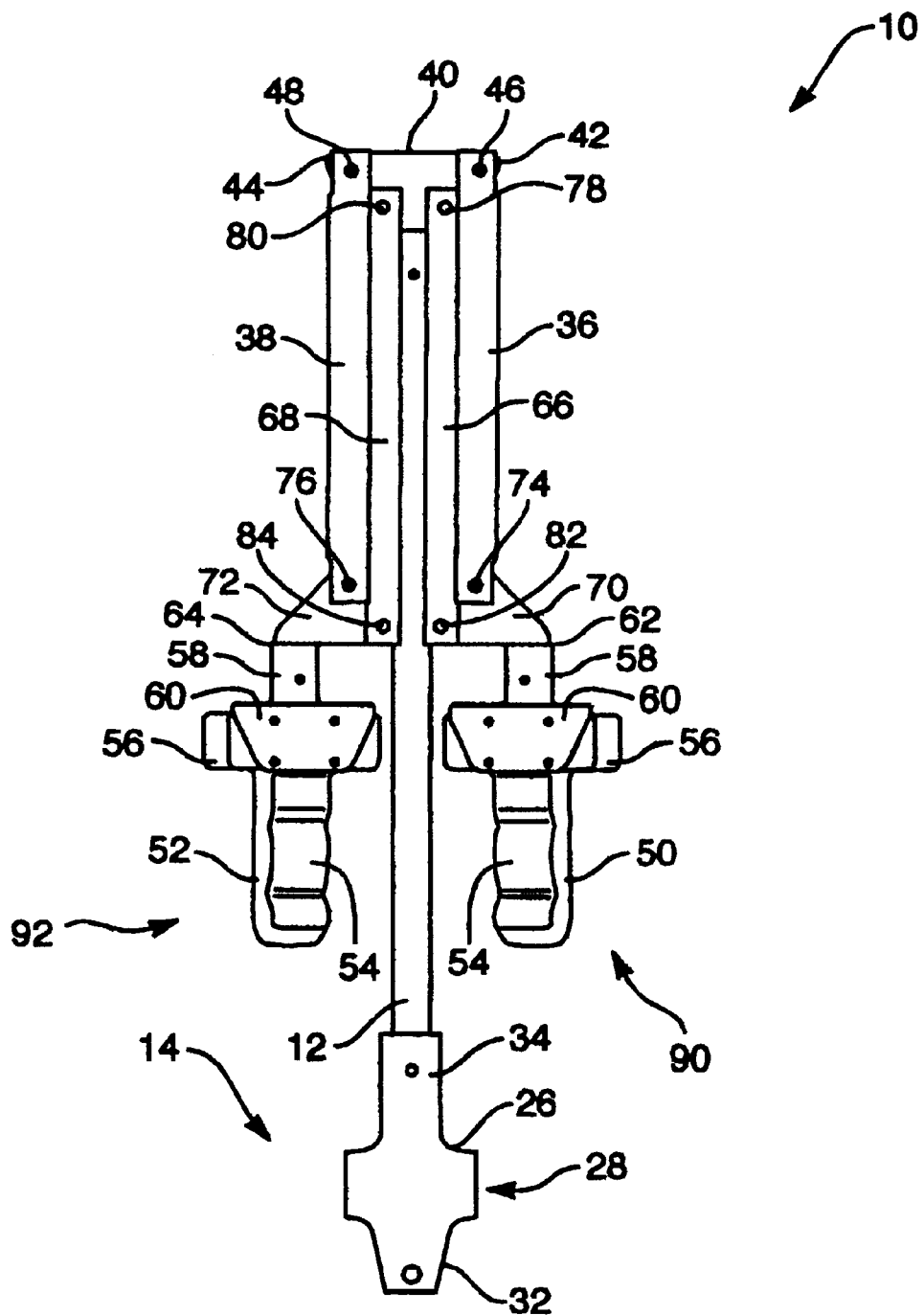
FIG. 16 is a front elevation view of the apparatus of FIGS. 13–15, illustrating both handles in a stowed position.

Referring to FIG. 14, the individual control structures 90, 92 may be positioned at different altitudes for different users. Referring to FIG. 15, the orientation of each of the handles 50, 52 remain the same regardless of the position of the cross beams 36, 38. Accordingly, the stowed position of a control system 90 is comparatively compact and readily adaptable to being stowed for entry and exit or for disuse by a non-pilot seated in one of the dual seats. Nevertheless, the handle 50 is readily deployable. As illustrated in FIG. 16, both control systems 90, 92 may be simultaneously stowed removing any obstruction to a pilot entering or leaving an aircraft.

In certain small aircraft, doors are small, and passengers must enter through doors beside the pilot and co-pilot seats. Accordingly, seats often move forward. Moreover, seat backs often are tilted far forward. Control systems positioned in front of a pilot may obstruct access to the rear seats of an aircraft, due to the inability of a seat to move forward past the control system. Similarly, a control system 10 must be positioned close to the front edge of the seat. Thus, full compactability of the control systems 90, 92 into a central location near the upright 12 permits aircraft designs having pilot co-pilot dual seats that can be moved forward, and seat backs that can be tilted forward with the only obstruction being the instrument panel in front of the cockpit.

From the above discussion, it will be appreciated that the present invention provides an upright mounted near one end to move in a pitch-control direction 16, and a roll-control direction 18. A cross beam having inboard and outboard ends, is pivoted at an inboard end to the upright.

The outboard end is connected to a control handle. The control handle may pivot with respect to the crossbeam, may be rigid with respect to the crossbeam, or may be pivotally secured to the crossbeam in an arrangement to maintain parallelism between the upright and the handle. The user may act on the handle of either crossbeam, each crossbeam being presented to a different user in a dual-seating arrangement. The crossbeams and handles may move to a stowed position near the upright, or to a deployed position directly in front of a user. Each operator has substantially equal access to operation of the stick. Nevertheless, either operator's control system may be stowed leaving no obstructions in front of the operator.

In certain embodiments, the upright and handle may actually move in every direction, substantially identically, simply removed by some distance from one another as parallel members, turning, pivoting, translating, and so forth in substantially identical paths removed from one another. Thus, an operator may obtain exactly the feel and control of a stick, yet have no stick extending between the operator's hands and the floor. Rather, the control handle may be positioned anywhere in front of a user, regardless the size of the user.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for providing control inputs for an aircraft, the apparatus comprising:
    an upright mounted proximate a first end to move in first and second degrees of freedom, orthogonal to one another, at a second end;
    a first cross beam having inboard and outboard ends and being pivotably mounted proximate the inboard end thereof to be movable proximate an outboard end thereof by a first user, in the second degree of freedom, and fixed with respect to the upright in the first degree of freedom; and
    a second cross beam having inboard and outboard ends and being pivotably mounted proximate the inboard end thereof to be movable proximate the outboard end thereof by a second user, in the second degree of freedom and independently from the first cross beam, and fixed with respect to the upright in the first degree of freedom.

2. The apparatus of claim 1, wherein the upright is mounted with the first end above the second end.

3. The apparatus of claim 1, further comprising a first handle connected to the outboard end of the first cross beam for gripping by a user.

4. The apparatus of claim 3, wherein the first handle is connected to move in rigid body motion with the first cross beam.

5. The apparatus of claim 3, wherein the first handle is connected to move in at least one degree of freedom with respect to the first cross beam.

6. The apparatus of claim 5, wherein the first handle is connected to pivot in the second degree of freedom with respect to the first cross beam, about a first axis, and in the second degree of freedom with respect to the upright about a second axis.

7. The apparatus of claim 5 wherein the first handle is connected to pivot in the second degree of freedom with respect to the first cross beam, and to translate in at least one degree of freedom with respect to the upright.

8. The apparatus of claim 7, wherein the first handle is connected to translate in two degrees of freedom with respect to the upright, and to not pivot with respect thereto.

9. The apparatus of claim 5, wherein the first cross beam further comprises a four-bar-linkage.

10. The apparatus of claim 9, wherein the four-bar-linkage is a parallelogram.

11. The apparatus of claim 10, wherein the first handle is configured to pivot in the second degree of freedom with respect to the first cross beam, about a first pivot axis, the first cross beam is configured to pivot in the second degree of freedom about a second pivot axis with respect to the upright, and the first handle is configured to pivot in substantially rigid body motion with the upright in the first degree of freedom.

12. The apparatus of claim 11, further comprising:
    a third cross beam connected to pivot in parallel with the first cross beam;
    a fourth crossbeam connected to pivot in parallel with the second cross beam;
    first and second links connected, respectively, between the first and third and the second and fourth cross beams, to pivot with respect thereto.

13. The apparatus of claim 12, wherein the first cross beam, third cross beam, upright, and first link form a parallelogram, and wherein the second cross beam, fourth cross beam, upright, and second link form a second parallelogram.

14. The apparatus of claim 13, further comprising first and second handles configured to move with the respective first and second links as extensions of the respective first and second parallelograms.

15. An apparatus comprising:
    an upright pivotable in first and second degrees of freedom;
    a first cross beam connected proximate an inboard end thereof to pivot in the second degree of freedom between a stowed position and a deployed position, in which an outboard end thereof is accessible to a first user to move the upright thereby in the first and second degrees of freedom; and
    a second cross beam pivotally connected proximate an inboard end thereof to pivot in the second degree of freedom between a stowed position and a deployed position, in which an outboard end thereof is accessible to a second user to move the upright thereby in the first and second degrees of freedom.

16. An apparatus comprising:
    an upright connected proximate a lower end to pivot in first and second degrees of freedom, orthogonal to one another;
    a first cross beam having inboard and outboard ends and being connected proximate the inboard end thereof to pivot the outboard end thereof in the second degree of freedom with respect to the upright;
    a second cross beam having inboard and outboard ends and being connected proximate the inboard end thereof to pivot, independently from the first cross beam, moving the outboard end thereof in the second degree of freedom with respect to the upright; and the first and second cross beams further configured to move the outboard ends thereof in fixed relation with respect to the upright in the first degree of freedom.

17. The apparatus of claim 16, further comprising third and fourth cross beams connected parallel to the first and second cross beams, respectively.

18. The apparatus of claim 17, further comprising a first handle secured to move with the upright and first cross beam in the first degree of freedom, pivotable with respect to the first cross beam in the second degree of freedom, and restrained against pivoting with respect to the first cross beam in the second degree of freedom.

19. The apparatus of claim 18, further comprising a bracket for securing the handle to the first cross bar.

20. The apparatus of claim 19, wherein the bracket is configured to pivot the handle in a third degree of freedom with respect to the first cross beam.

\* \* \* \* \*

UNITED STATES PATENT AND TRADEMARK OFFICE
CERTIFICATE OF CORRECTION

PATENT NO.  : 6,347,770 B1
DATED       : February 19, 2002
INVENTOR(S) : Eduward A. Oyzerskiy and McGregor L. Corliss It is certified that error appears in the above-identified patent and that said Letters Patent is hereby corrected as shown below:

Column 2,
Lines 24 and 53, please delete "copilot", and insert therefor -- co-pilot --.
Line 31, please delete "fill", and insert therefor -- full --.

Column 6,
Line 38, after "thereof", please insert -- . --.

Column 7,
Line 39, after "50", please insert -- , --.

Column 10,
Line 18, after "apparatus", please insert -- 10 --.

Signed and Sealed this

Eighteenth Day of March, 2003

JAMES E. ROGAN
*Director of the United States Patent and Trademark Office*